Feb. 23, 1965 R. SOKOLER 3,171,036

FLIP-FLOP CIRCUIT WITH SINGLE NEGATIVE RESISTANCE DEVICE

Filed Nov. 16, 1959

INVENTOR
R. SOKOLER
BY
Charles Scott Phelan
ATTORNEY

United States Patent Office 3,171,036
Patented Feb. 23, 1965

3,171,036
FLIP-FLOP CIRCUIT WITH SINGLE NEGATIVE RESISTANCE DEVICE

Roy Sokoler, New Brunswick, N.J., assignor to Bell Telephone Laboratories, Incorporated, New York, N.Y., a corporation of New York Filed Nov. 16, 1959, Ser. No. 853,350
10 Claims. (Cl. 307—88.5)

This invention relates to a bistable semiconductor circuit employing a single negative resistance device.

A bistable electric circuit is generally considered to be a circuit which exists in either one of two stable operating conditions and which may be triggered back and forth between these two stable conditions by the application of input pulses. Many bistable circuits are responsive to input pulses of only one polarity. Some prior art bistable circuits employ a plurality of negative resistance devices, and some employ only one negative resistance device. The operation of circuits employing more than one negative resistance device is sometimes independent of the time constants of other circuit elements, but when only one negative resistance device is employed the time constants of circuit elements other than the one negative resistance device control the circuit operation.

Accordingly, it is one object of the invention to simplify bistable circuits.

Another object is to employ a single negative resistance device in conjunction with passive circuit elements in an electric circuit to produce a two-condition output voltage wave in response to successive input pulses of a single polarity.

A further object is to generate a bistable output signal independently of time constants in the generator circuit.

These and other objects of the invention are realized in an illustrative embodiment thereof in which a PNPN diode, having in its voltage-versus-current characteristic a negative resistance portion, is connected between the terminals of a potential source in series with a second diode having no negative resistance portions in its voltage-versus-current characteristic. A capacitor is connected in a circuit which shunts the series combination of the two diodes, and an output circuit is also connected across the combination of the two diodes. A pulse source is provided to apply pulses to a common terminal of the two diodes for biasing the PNPN diode OFF and ON in response to pulses of a single polarity whereby two different output conditions are produced alternately and independently of time constants.

Figure 1:
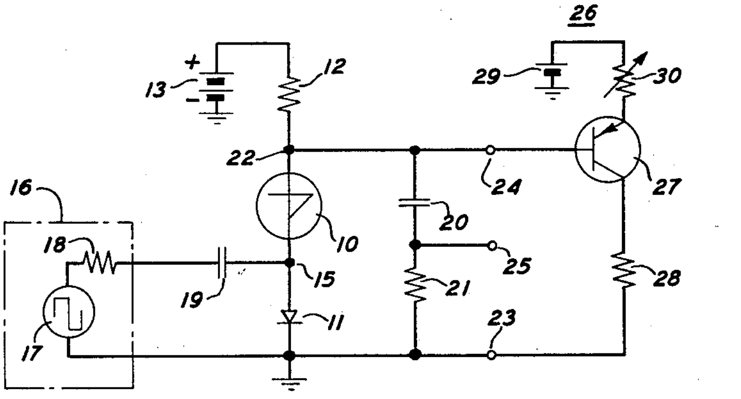

A better understanding of the invention and the various objects and advantages thereof may be derived upon a consideration of the following specification, including the appended claims, in connection with the attached drawing, in which:

FIG. 1 is a schematic diagram of one embodiment of the invention; and

FIGS. 2 through 5 comprise voltage and current waveforms, all with respect to a common time scale, illustrating the operation of the circuit of FIG. 1.

In FIG. 1 a PNPN diode 10 is connected in series with a diode 11 and a resistor 12 between the positive terminal of a batttery 13 and ground. Diodes 10 and 11 are both poled for forward conduction of electric current from the positive terminal of battery 13. The negative terminal of battery 13 is connected to ground.

The PNPN diode is a device which is now well known in the art, and both the construction and operating characteristics of the device are described in the W. Shockley Patent No. 2,855,524 which issued October 7, 1958. Briefly, however, such diodes are characterized by a voltage-versus-current characteristic which includes a low conduction, positive resistance portion and a high conduction, positive resistance portion separated by an unstable negative resistance portion. For most practical applications it can be considered that the PNPN diode is an open circuit when it is in its so-called low conduction condition. An applied forward voltage in excess of a critical breakdown voltage $E_{bk}$ is required to move the operating point of the diode from its low conduction, positive resistance portion into its negative resistance portion. Since the diode is unstable in its negative resistance condition, however, its operating point is immediately transferred to the high conduction, positive resistance portion of its characteristic if there is sufficient current available to sustain the diode in that condition. If at any time thereafter the current through the diode falls below a critical turn-off level $I_{to}$, the diode is restored automatically to its low conduction, positive resistance condition. This operation of the PNPN diode is quite different from the operation of an ordinary diode, such as the diode 11, which includes only positive resistance portions in the voltage-versus-current characteristic thereof and which characteristic also includes high and low resistance portions characterized respectively by low conduction and high conduction. Diode 11 may be switched back and forth between its high and low conduction conditions by appropriate reversals of the applied bias voltage as is well known in the art.

The terminal voltage of battery 13 is somewhat smaller than the breakdown voltage $E_{bk}$ of diode 10. Resistor 12 is assigned a resistance such that the maximum current that may flow therethrough from battery 13 under any conditions of operation is somewhat greater than the turn-off current $I_{to}$ of diode 10. A source 16 of rectangular pulses comprises a generator 17 having one terminal grounded and an internal resistance represented by a resistor 18. A capacitor 19 couples the output of source 16 to a common terminal 15 of diodes 10 and 11.

A branch circuit is provided in shunt with respect to the series combination of diodes 10 and 11 and comprises a capacitor 20 connected in series with a resistor 21 between ground and a terminal 22 which is common to diode 10 and resistor 12. Resistor 12 has a resistance which is substantially larger than the resistances of either resistor 18 or resistor 21 to assure operation of the circuit in the manner to be described. Resistor 21 is included to develop at terminal 25 an additional output voltage wave with negative-going spikes if desired.

Output terminals 23 and 24 are provided for the bistable circuit at ground and in direct connection with the terminal 22. An emitter follower amplifier 26 is connected to output terminals 23 and 24 to provide current gain if needed, but this amplifier is not essential for the operation of the invention. Amplifier 26 includes a transistor 27 having the base electrode thereof connected to output terminal 24 of the bistable circuit and having the collector electrode thereof connected to ground via a resistor 28. A battery 29 and an adjustable resistor 30 are connected in series between ground and the emitter electrode of transistor 27.

Figure 2:
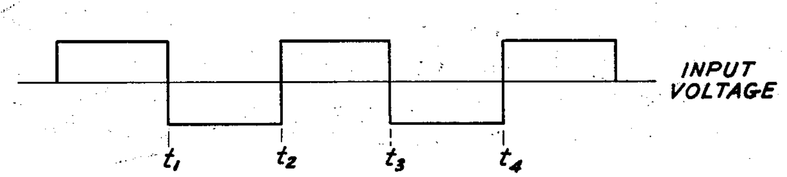

The operation of the bistable circuit of FIG. 1 may be considered by assuming first that capacitor 20 has been charged to the terminal potential of battery 13 and that transistor 27 is biased OFF, i.e. nonconducting, by the voltage across capacitor 20. Diodes 10 and 11 are both nonconducting. In the absence of a negative-going pulse from source 16, diode 10 remains nonconducting even though capacitor 20 is fully charged since the potential difference across capacitor 20 corresponds to the terminal voltage of battery 13 which, as hereinbefore indicated is less than the breakdown voltage $E_{bk}$ of diode 10. The alternate positive and negative input pulses illustrated in FIG. 2 are differentiated by capacitor 19 and diode 11. Each differentiated positive impulse tends to bias diode 11 ON in its relatively high conducting condition and each differentiated negative impulse tends to bias diode 11 OFF in its relatively low conducting condition.

Figure 3:
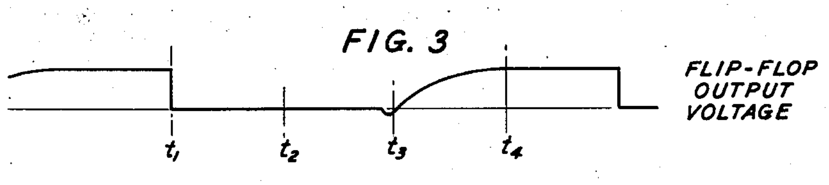
Figure 4:
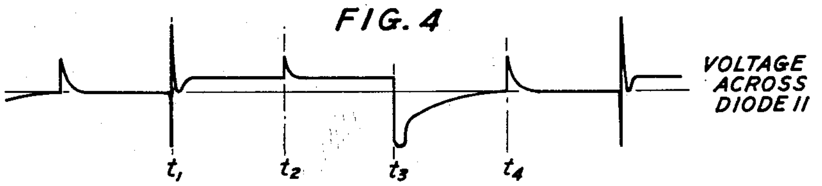

The first negative-going impulse coupled to terminal 15 from source 16 occurs at a time $t_1$ and is of sufficient magnitude, together with the potential difference across capacitor 20, to bias diode 10 into conduction. Initially, this same negative-going impulse biases diode 11 OFF. Capacitor 20 discharges through a path which includes terminal 22, diode 10, capacitor 19, resistor 18, generator 17, and resistor 21. Capacitor 19 becomes charged to a potential difference which opposes the output from source 16 and is of sufficient magnitude to apply a positive forward bias to diode 11. As indicated in FIG. 3, the output voltage waveform between terminals 23 and 24, the discharge of capacitor 20 takes place almost instantaneously, and thereafter the current supplied to diode 10 from battery 13 through resistor 12 and diode 11 is sufficient to maintain diode 10 in its high conduction condition. Diodes 10 and 11 comprise a low impedance shunt across the series combination of capacitor 20 and resistor 21, and such shunt prevents capacitor 20 from recharging. Capacitor 19 is unable to discharge sufficiently to bias diode 11 OFF, and the circuit is stabilized in a first operative condition. There are no time constants which can influence the time during which the circuit remains in that condition.

The first positive-going impulse coupled to terminal 15 from source 16 occurs at time $t_2$. This impulse reverses the charge on capacitor 19, but it continues to maintain a positive potential difference across diode 11. The result is a slight impulse in the voltage across diode 11 at time $t_2$ but no perceptible effect upon the output voltage between terminals 23 and 24. The steady positive voltage illustrated in FIG. 4 between the times $t_1$ and $t_2$ simply represents the potential drop of about one-third of a volt across diode 11. This drop does not appear in the output voltage wave of FIG. 3 because the maximum voltage swing there is, for example, 35 volts and a 0.3 volt change is not perceptible on such a waveform diagram.

A second negative-going impulse from source 16 occurs at time $t_3$ and biases diode 11 OFF once more thereby forcing current from diode 10 to flow through capacitor 19 and source 16. This negative-going impulse also tends to increase the current flowing in diode 10. However, since resistor 12 and capacitor 19 have a substantially larger time constant than do resistor 21 and capacitor 20, the increment of increased current is initially driven through resistor 21, capacitor 20, and diode 10. The latter current produces the small negative impulse in the output voltage at time $t_3$. This effect is rapidly offset, however, as battery 13 takes over and supplies current through resistor 12 to charge both capacitor 19 and capacitor 20 positively with respect to ground.

When capacitor 20 begins to charge positively with respect to ground, a substantial current is diverted from diode 10. This diversion of current is sufficient to reduce the current in diode 10 below its current turn-off level and thereby bias diode 10 back to its high impedance, low conduction condition. The restoration of diode 10 to its high impedance condition takes place almost as soon as the division of current first occurs and long before a sufficient positive charge can be accumulated on capacitor 19 to override source 16 and bias diode 11 into conduction.

When the negative-going impulse from source 16 occurred at time $t_1$, diode 10 was OFF, and capacitor 20 was fully charged and could not divert current away from diode 10. Thus, the negative-going impulse biased diode 10 ON. When the next negative-going impulse occurred at time $t_3$, however, diode 10 was ON, and capacitor 20 was almost completely discharged and was able to divert sufficient current away from diode 10 to restore diode 10 to its high impedance condition. Once the bistable circuit had been established in either of its stable conditions it was no longer dependent upon the charge on capacitor 20 to remain in that stable condition, and it also was not dependent upon time constants to remain in either stable condition.

Capacitor 20 continues to charge toward the terminal voltage of battery 13, and the flip-flop circuit is restored to its original assumed condition. At time $t_4$ a second positive-going pulse from source 16 biases diode 11 ON, but it is of the wrong polarity to affect diode 10. The bistable circuit rests in the second stable condition independently of time constants until another negative-going impulse is applied from source 16 to start the cycle once more.

Figure 5:
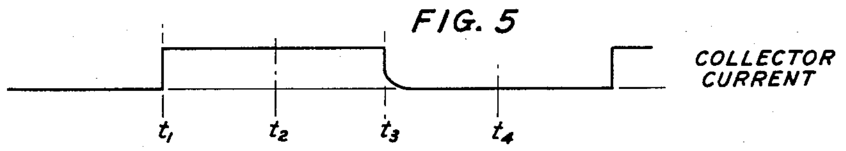

The voltage wave appearing between output terminals 23 and 24 is as illustrated in FIG. 3 and comprises alternate positive-going portions and intermediate portions of essentially zero potential. This waveform applied to the base electrode of transistor 27 produces current pulses in the collector circuit thereof as illustrated in FIG. 5. Similarly, a voltage wave appears at the emitter electrode of transistor 27 with a waveform corresponding to the waveform illustrated in FIG. 3.

In summary, the bistable circuit is characterized by a first output condition with PNPN diode 10 OFF and with a positive voltage between the output terminals 23 and 24. It is further characterized in that a first negative impulse applied across diode 11 produces a second output condition with diode 10 ON and essentially zero volts between output terminals 23 and 24. The occurrence of a second negative implse restores the first-mentioned output condition.

The switching of diode 10 is a function of the presence of, or absence of, input pulses of a certain single polarity, i.e., negative input pulses in the case of the embodiment illustrated in FIG. 1. The time at which such switching of diode 10 takes place is independent of time constants of other circuit elements. For this reason it is not necessary that source 16 provide a cyclic train of pulses, for randomly occurring pulses could also operate the circuit properly. Similarly, it is apparent from FIGS. 2 through 5 that the positive-going pulses of FIG. 2 serve no useful purpose in the embodiment of FIG. 1, and that pulses of only a single polarity are necessary. The polarity of the pulses is selected in accordance with the poling of the diodes employed.

Although the invention has been described in connection with a particular embodiment thereof, it is to be understood that additional embodiments which will be apparent to those skilled in the art are included within the spirit and scope of the invention.

What is claimed is:

1. A bistable circuit comprising a nonlinear impedance device responsive to bias voltage in excess of a predetermined magnitude for initiating substantial conduction therein and responsive to the reduction of current flowing therethrough for terminating said substantial conduction, a source of pulses, at least a portion of the pulses of said source having the same polarity, means connected to said device for applying said pulses to said device for biasing said device into conduction in response to alternate ones of said portion of pulses, and means connected to said device for diverting current therefrom to terminate said conduction in response to intermediate ones of said portion of pulses.

2. A trigger circuit having two stable states of operation, said circuit comprising a PNPN diode having first and second terminals, means supplying current to said diode, means applying to said first terminal of said diode voltage impulses of one polarity and of sufficient magnitude to bias said diode into conduction, and means connected to said second terminal of said diode and responsive to the concurrence of one of said impulses with conduction in said diode for diverting sufficient current away from said diode to terminate said conduction.

3. A bistable circuit comprising a source of potential, two diodes connected in a series circuit between the terminals of said source, each of said diodes having high and low conduction conditions in response to different applied potentials, one of said diodes having a predetermined minimum applied potential requirement for biasing such diode into its high conduction condition and having a predetermined minimum current requirement for sustaining conduction in its high conduction condition, a capacitor connected in shunt with said series circuit, means applying across only the other of said two diodes pulses of sufficient magnitude to bias said one diode into its high conduction condition, an output circuit connected across both of said diodes, and said potential source having insufficient terminal voltage to bias said one diode for conduction in the absence of one of said pulses but supplying after a first one of said pulses sufficient current to maintain said one diode in conduction in the absence of further pulses.

4. A bistable circuit comprising two diodes each having a high and a low conduction condition in response to different applied potentials, one of said diodes having an unstable negative resistance condition and also having a predetermined minimum current requirement for sustaining conduction in said high conduction condition, a source of potential having maximum current output which is greater than said minimum current requirement, means connecting said diodes in series between the terminals of said source, both of said diodes being poled for forward conduction of current in the same direction, a capacitor connected in shunt with respect to the series combination of said diodes, means applying impulses across a second one of said diodes with impulse polarities tending to bias said second diode ON and OFF alternately, and an output circuit connected across the series combination of said diodes.

5. A bistable circuit comprising a source of direct potential, a single PNPN diode connected between the terminals of said source, said diode having a breakdown voltage which is greater than the output voltage of said source and having a sustaining current which is less than the current output from said source, an asymmetrically conducting device connected in series with said diode between said terminals and poled for forward conduction in the same direction as said diode, a source of alternating potential having the output thereof coupled across said device, and means operative during a portion of the cycle of said bistable circuit for shunting sufficient current away from said diode to reduce the diode current to a value which is less than said sustaining current, said means comprising a capacitor connected in shunt with the series combination of said device and said diode.

6. A flip-flop circuit comprising a source of potential, a first resistor, two non-linear conducting devices connected in series with said resistor between the terminals of said source, each of said devices having a stable high conduction condition and a stable low conduction condition, a first one of said devices having in the voltage-versus-current characteristic thereof an unstable negative resistance portion between the high and low conduction portions thereof, said first device also having a minimum current requirement for sustaining operation in said high conduction condition, a second one of said devices having only positive resistance portions in the voltage-versus-current characteristic thereof, means biasing said second device back and forth between said high and low conduction conditions, and means biasing said first device from either one of its conduction conditions to the other in response to the application to said second device of voltages tending to bias said second device to its low conduction condition, the last-mentioned means comprising a capacitor and a second resistor connected in series with one another and in shunt with respect to the series combination of said two devices, the resistance of said first resistor being much larger than the resistance of said second resistor.

7. A trigger circuit comprising a PNPN diode, said diode having a high impedance condition in response to the application thereto of forward bias potentials of a magnitude which is smaller than a predetermined breakdown potential, said diode also having a low impedance condition in response to forward bias voltages in excess of said breakdown potential provided that a minimum sustaining current is available, a second diode, a source of potential capable of supplying to said diodes a current which exceeds said sustaining current, said source having an output potential which is less than said breakdown voltage, a resistor connected in series with said diodes between the terminals of said source, a first capacitor, a source of pulses connected in series with said capacitor between the terminals of said second diode, the pulses from said pulse source being of sufficient magnitude together with the output voltage from said potential source for applying to said first diode a potential difference which exceeds said breakdown voltage, a second capacitor connected in a branch circuit shunting both of said diodes, and an output circuit connected between the terminals of said branch circuit.

8. A bistable circuit comprising a capacitor, first and second diodes connected in series between the terminals of said capacitor, said first diode having a predetermined breakdown voltage which must be exceeded to initiate conduction therethrough and having a predetermined minimum current which must be maintained to sustain conduction, means charging said capacitor to a voltage which is less than said breakdown voltage, means applying pulses to said diodes for triggering said circuit back and forth between its two stable operating conditions, a first one of said pulses biasing said first diode into conduction for discharging said capacitor, means in said applying means responsive to the discharge of said capacitor for biasing said second diode into conduction thereby establishing a first stable operating condition for said bistable circuit, said first and second diodes comprising a low impedance shunt for preventing the recharge of said capacitor, a second pulse from said source of the same polarity as said first pulse for biasing said second diode into a nonconducting condition to open-circuit said low impedance shunt and permit said capacitor to divert sufficient current from said first diode to restore said first diode to its nonconducting condition and establish a second stable operating condition for said circuit.

9. A flip-flop circuit comprising a battery, two diodes and a first resistor connected in series between the terminals of said battery, a first one of said diodes comprising a PNPN diode having a predetermined minimum breakdown voltage which is greater than the applied voltage from said battery and having a predetermined minimum sustaining current requirement which is less than the maximum output current from said battery with both of said diodes conducting, a second one of said diodes being responsive to positive and negative applied voltages for presenting either a low or a high forward impedance between the terminals thereof, a capacitor and a second resistor connected in series between the terminals of the series combination of said two diodes, said second resistor having a substantially smaller resistance than said first resistor, a pulse generator having a predetermined internal resistance which is much less than the resistance of either of said first and second resistors, a coupling capacitor connected in series with said generator between the terminals of said second diode, at least a portion of the pulses from said generator being of sufficient magnitude when coupled to said second diode to increase the total potential difference between the terminals of said first diode to a value which is greater than said breakdown voltage, and an output circuit connected across the series combination of said two diodes.

10. A bistable circuit comprising a diode, a source connected to supply current to said diode, a source of sequentially occurring pulses, at least a portion of the pulses from the last-mentioned source all having the same polarity, means biasing said diode into conduction in response to alternate ones of said portion of pulses, and means including a capacitor biasing said diode into a non-conducting condition in response to intermediate ones of said portion of pulses.

References Cited in the file of this patent

UNITED STATES PATENTS

| | | |
|---|---|---|
| 2,735,011 | Dickinson | Feb. 14, 1956 |
| 2,768,294 | Overbeek | Oct. 23, 1956 |
| 2,944,164 | Odell et al. | July 5, 1960 |

| | | |
|---|---|---|
| 2,997,604 | Shockley | Aug. 22, 1961 |
| 3,040,191 | Bright | June 19, 1962 |
| 3,040,195 | Jones et al. | June 19, 1962 |
| 3,071,698 | Thompson et al. | Jan. 1, 1963 |

OTHER REFERENCES

Shockley Transistor Corporation, application data, AD–1 etc., TK7872, T73S56, C2, February 1959, 5 pages are relied on.